March 26, 1968 R. D. ROBINSON 3,375,334

TESTING APPARATUS FOR IDENTIFYING WIRE PAIRS IN MULTICONDUCTOR CABLES

Filed June 12, 1964 2 Sheets-Sheet 1

INVENTOR

ROBERT D. ROBINSON

BY Robb & Robb

ATTORNEYS

March 26, 1968 R. D. ROBINSON 3,375,334

TESTING APPARATUS FOR IDENTIFYING WIRE PAIRS IN MULTICONDUCTOR CABLES

Filed June 12, 1964 2 Sheets-Sheet 2

INVENTOR

ROBERT D. ROBINSON

BY Robb & Robb

ATTORNEYS 3,375,334

TESTING APPARATUS FOR IDENTIFYING WIRE PAIRS IN MULTICONDUCTOR CABLES

Robert D. Robinson, 132 Fairfield Ave., Syracuse, N.Y. 13207

Filed June 12, 1964, Ser. No. 374,761
5 Claims. (Cl. 179—175)

ABSTRACT OF THE DISCLOSURE

My invention concerns testing apparatus for identifying conductor pairs at a remote point of a multiconductor cable such as is commonly used in the communications field. The apparatus preferably comprises visual signal indicator means in the form of a plug-in numbered signal light indicator unit which can be quickly connected to a group of wire pairs of a multipair cable at the terminal frame at the usual central office of a telephone system or the like, and which is operable responsive to the making of contact by a clip or other appropriate connector of a battery or other suitable power circuit, with one conductor (preferably the tip side) of a wire pair at any remote point along the cable, thereby energizing one of the signal lights of the numbered indicator unit so that the wire pair may be identified by a corresponding identification number when communicated by a helper or observer at the central office to a worker or splicer at the remote station where the clip or connector is applied to the cable.

The plug-in signal light indicator unit also preferably includes means for establishing verbal communication over one wire pair of the cable between the central office station and the remote station along the cable where a special relay unit is operatively connected to the cable, said relay unit including a communication circuit connected to the "talk pair" of the cable, and also including a warning indicator, such as a red signal light, which is operable responsive to the relays of the relay unit to energize the warning signal light when the clip or connector is connected to a "busy" wire pair of the cable. Upon removal of the clip from contact with the "busy" wire pair, the relays function to restore the identification equipment for further immediate use in identifying other wire pairs of the cable, and the warning signal light is simultaneously de-energized when the clip is disconnected from the "busy" wire pair.

*Specification*

The present invention relates to testing equipment, and more particularly, to testing apparatus for identifying conductor pairs at a remote point of a multipair cable such as is commonly used in the communications field.

In telephone cables, at least one end of the cable is connected to a main frame or terminal panel located at a central office, with each wire pair electrically connected to a terminal post of the frame, with the posts arranged in predetermined order and normally identified by numbers running from one through one hundred and one or more each cable. Many telephone cables in common use in the United States have more than one hundred and one conductor pairs, and in such larger cables which sometimes may have as many as twenty-four hundred pairs, the pairs are usually wrapped in groups of one hundred or one hundred and one pairs.

The problem of pair identification arises when the remote end of the cable is to be connected to another terminal panel or is to be spliced into another cable, as when extending the cable system or rearranging the system to promote full pair usage.

The method of identifying the wire pairs of a multiconductor cable most commonly used heretofore requires the services of at least two workers, usually a splicer who assumes a station at the remote end of the cable or at any point therealong where a splice is to be made, and a helper who assumes a station at the main frame at the central office or at any other terminal panel where the cable begins. Before beginning the wire pair identification operations, the helper first selects any suitable wire pair of the cable, usually an odd pair, and by any suitable means imposes a tone thereon. By means of a probe, amplifier and a suitable receiver preferably having a head set, the splicer at the remote point of the cable picks up the tone and identifies this wire pair for use as a talk pair between the splicer and the helper when the splicer and helper have each connected to this initially identified pair suitable conversing equipment to permit conversation between them at all times. Thereafter, they can proceed with identification of other wire pairs of the cable. This identification is performed by having the helper successively apply a tone to each wire pair until the splicer successively picks up the tone on each pair and tags each pair according to the number identifications communicated to the splicer by the helper as determined by the numbers at the main frame or terminal panel end of the cable where the helper is located. This operation is continued until all wire pairs are identified and tagged by the splicer. Such operations are obviously tedious and time-consuming, and may require at least an hour or more for each hundred wire pairs.

It has been proposed to employ automatic selector equipment which can be remotely controlled by the splicer alone to successively apply the tone to the wire pairs in predetermined order, and thus dispense with the services of the helper and reduce the time of the identifying operations, but such equipment has not proved practical, but rather is too costly and bulky and requires too much time to set up before being ready for identification of the wire pairs.

While the present invention still requires the services of two workers, such as the usual splicer and a helper, it is capable of performing the wire pair identifications much more efficiently and in considerably less time, usually about one-half, than the time normally required in the case of conventional procedures previously used.

One of the primary objects of the present invention is to provide relatively simple, inexpensive and efficient equipment which can be quickly set up and utilized to quickly identify the wire pairs of a multipair cable with a minimum of skill and effort.

A further object of the inventor is to provide visual signal indicator means preferably in the form of a plug-in numbered signal light indicator unit which can be quickly connected to a group of wire pairs of a multipair cable at the terminal frame and which is operable responsive to the making of contact of a clip or other appropriate connector of a battery or other power circuit, with one conductor (preferably the tip side) of a wire pair at any remote point along the cable, thereby energizing one of the signal lights of the numbered indicator unit so that the pair may be identified by a corresponding identification number when communicated to the worker at the remote station where the clip or connector is applied to the cable.

A still further object of the invention is to provide as a part of the identification equipment aforementioned suitable means for preventing interference with so-called "busy" wire pairs of the cable should the clip or connector be brought into contact with one of the conductors of a wire pair in active use, said means preferably including a warning indicator, such as a red signal light, which preferably remains energized until contact with the busy wire pair is interrupted, and thereby restoring the identification equipment for immediate use in identifying other wire pairs of the cable.

My invention further contemplates the provision of equipment of this character which is comparatively light in weight, compact and readily portable.

Other and further objects and advantages of the invention will become apparent from the following description and the accompanying drawings, and the novel features thereof will be defined in the appended claims.

In the drawings:

FIG. 1 is a diagrammatic view of my improved identification equipment or system as applied to a conventional multipair telephone cable or the like;

Figure 1:
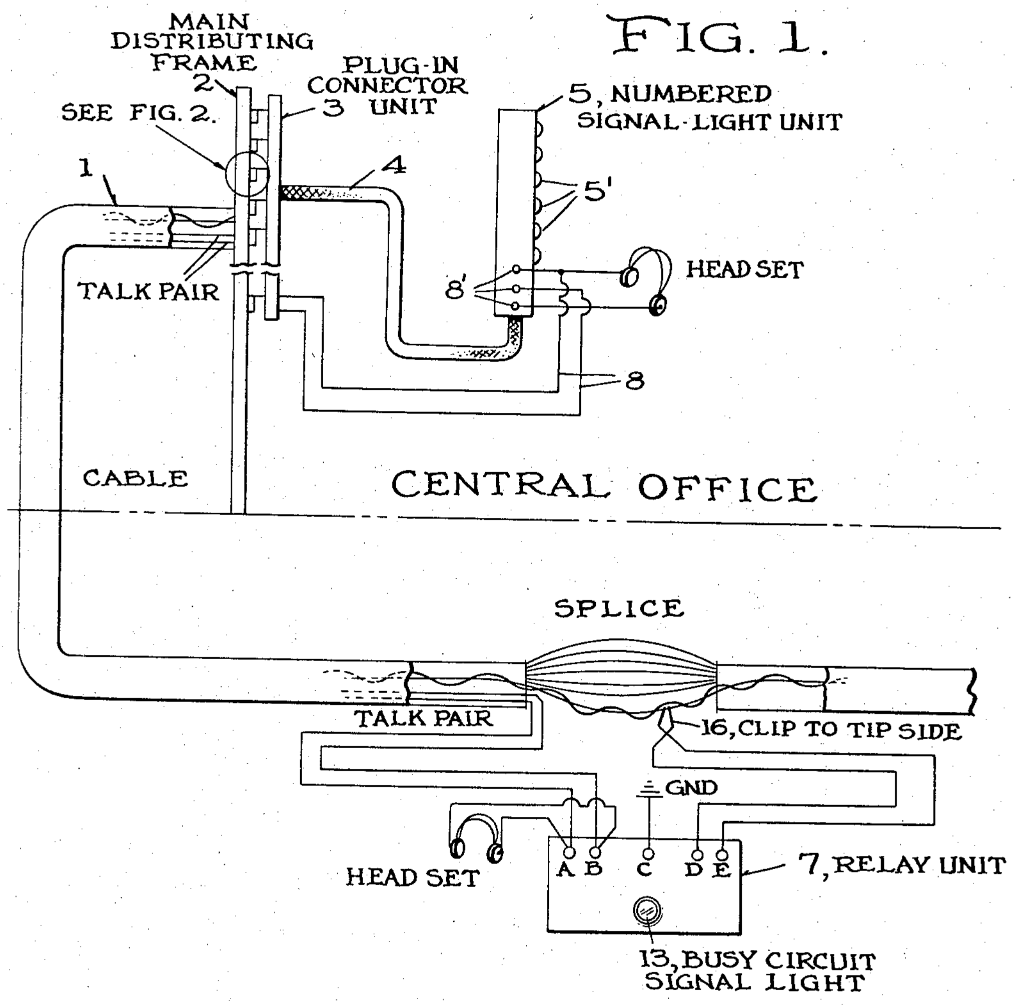

Like reference characters designate corresponding parts in the various figures of the drawings, wherein 1 generally denotes a conventional telephone cable of the multipair type, and each pair having one conductor commonly referred to as the "tip" side and another conductor commonly referred to as the "ring" side of the pair. As shown in FIG. 1, the respective wire pairs of the cable 1 are connected in the usual manner in a predetermined order to terminals at a main frame generally designated 2 as customarily located at a central office of the telephone system. The details of one of the respective terminals, designated 2′, are more or less diagrammatically illustrated in FIG. 2, which also shows the usual connections of the terminal unit with circuits to the conventional central office equipment as well known to those skilled in this art, and which usually includes a central office battery (not shown) which is usually connected to the ring side of the terminal unit 2′.

Figure 2:
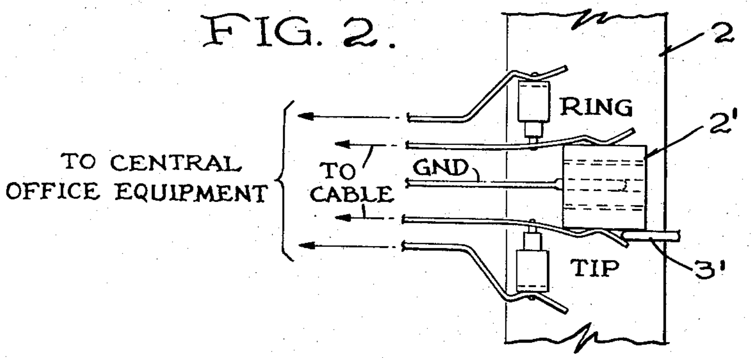
FIG. 2 is an enlarged fragmentary detail view of one pair terminal at the main frame in a central office of the telephone system, with one if the plugs of the multiplug connector unit shown in operative plugged-in engagement with the tip side of the wire pair.
Figures 3, 4, 5:
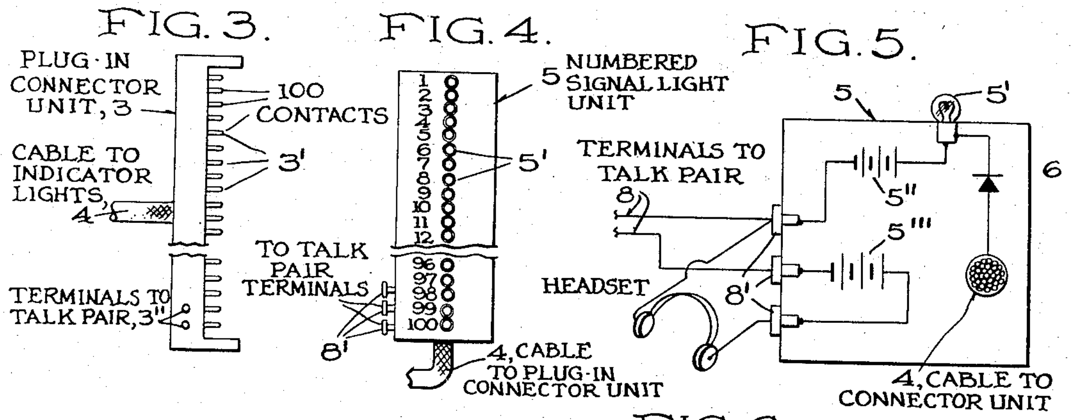
FIG. 3 is a more or less diagrammatic view in side elevation of the multiplug connector unit.
FIG. 4 is a diagrammatic view in front elevation of the numbered signal light unit.
FIG. 5 is a circuit diagram illustrating the electrical circuit of one of the signal lights of the unit if FIG. 4.

Assuming that a splice is to be made at a remote point along cable 1, the outer covering of the cable is opened at the splice point to expose the wire pairs, but until the respective pairs are specifically identified, as by appropriate numbers corresponding to those at the terminal frame 2, the splicer cannot tell one wire pair from another. For purposes of such identification, I utilize three relatively simple, compact and readily portable units which can be quickly set up for use in testing and numerically identifying the wire pairs if the cable 1. The first of these units is a connector unit generally designated 3 which preferably is of a multiplug type which can be plugged into a group of terminals 2′ at the terminal frame 2 to establish contact with the tip side of each wire pair of any predetermined group of pairs of cable 1. The plug unit may have as many as one hundred, more or less, male contact pins or plugs 3′ arranged in appropriate order for insertion in the terminals 2′ as best illustrated in FIGS. 1 to 3. Connected with the pins or plugs 3′, and extending from the plug unit 3, is a multiconductor cable 4 which is connected at its opposite end with an indicator unit generally designated 5, which is also located at the central office and which may be set up near the terminal frame where it can be conveniently observed by a helper or splicer's assistant. The indicator unit 5 is preferably provided with a plurality of numbered signal lights 5′, preferably corresponding in number to the number of wire pairs with which the plug unit 3 is connected so that there is one signal light for each wire pair. Each signal light is arranged in circuit with a diode 6, and all of the signal lights are also connected in circuit with a common batery 5″ of appropriate voltage to energize the lights 5′, which may be miniature neon lamps or other appropriate light bulbs, under the control of still another unit 7 located at the remote splice point along the cable 1 where the splicer is stationed. This battery 5″ is preferably of variable voltage so that the voltage may be selected according to the resistance of the conductors of cable 1, since the farther away from the central office the splice is to be made, the greater the resistance and the greater the voltage is needed at battery 5″. Verbal communication between the remote splicer's station and the helper's station at the central office is preferably provided in any suitable manner, as by conductors 8 extending between the terminals 8′ at the signal unit 5 and corresponding terminals 3″ at the connector plug unit 3, with the terminals 8′ connected to a battery 5‴ and with a head set (including a transmitter not shown) as diagrammatically shown in FIG. 5.

From the connector plug unit 3, the communication circuit is extended through one wire pair, preferably a spare or odd pair of cable 1, to the unit 7 at the remote point where the cable is to be spliced, and this so-called "talk pair" is connected to the terminals A and B of unit 7, to which another head set (including a transmitter not shown) is connected for use by the splicer for communicating with the helper at the central office.

Figure 6:
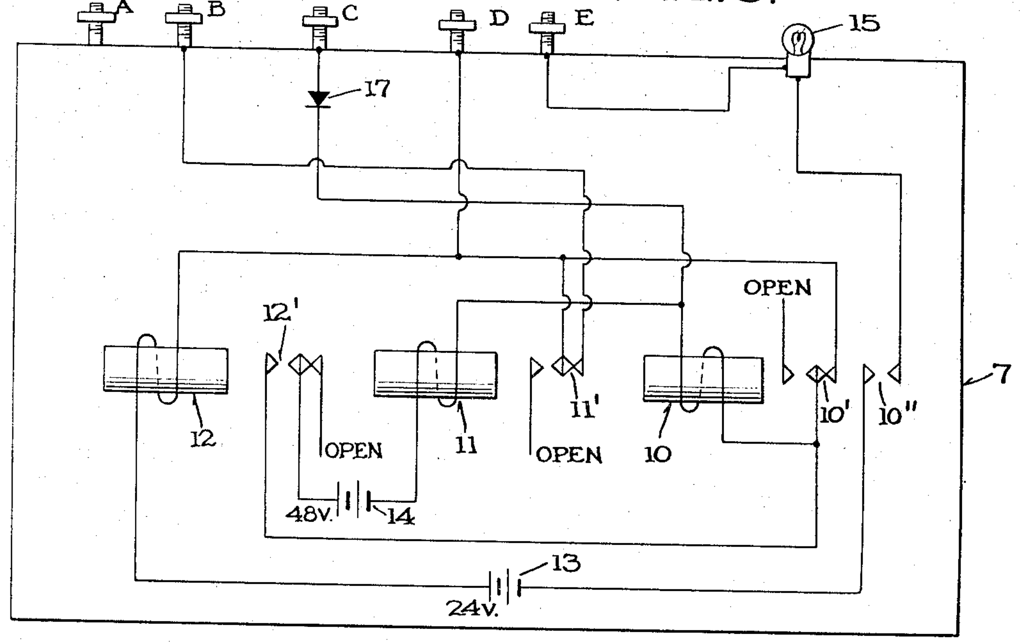
FIG. 6 is a circuit diagram of the relay unit which controls the warning signal light which is responsive to any "busy" wire pair of the cable which may be encountered in the course of identifying the wire pairs of the cable.

The unit 7 is provided with a ground terminal designated C which is connected to the cable 1, the outer cover of which is usually grounded, and the terminal C is also connected to one of three relays within the unit 7, said relays being respectively designated 10, 11 and 12 which are arranged in circuit with each other and with two batteries designated 13 and 14, all as clearly shown in FIG. 6.

Figure 7:
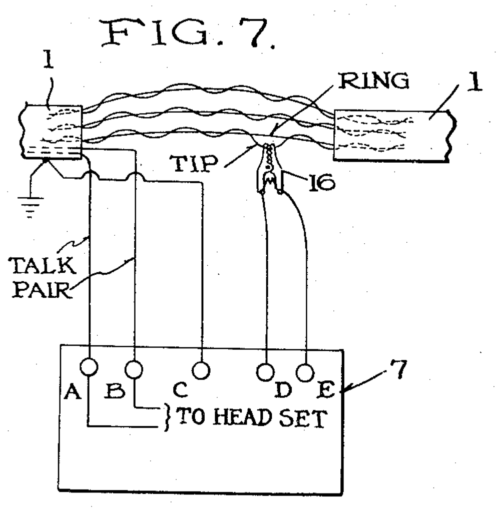
FIG. 7 is a diagrammatic view showing the relay unit of FIG. 6 operatively connected to the cable and to the tip side if one wire pair.
Figure 8:
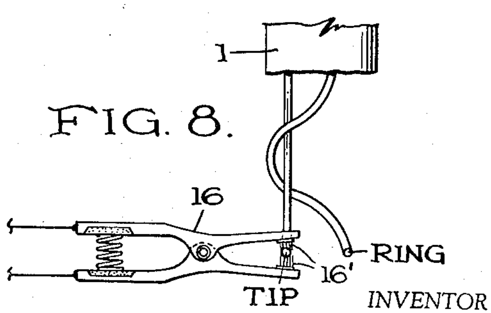
FIG. 8 is an enlarged detail view in side elevation of the connector clip as applied to the tip side of a wire pair.

Additional terminals D and E for the unit 7 are provided and are connected interiorly of the unit with the relay circuits as shown in FIG. 6, with the terminal E being directly connected to one side of a signal indicator light 15 which functions as a visual warning signal when energized under control of the relays under certain circumstances as hereinafter more particularly described. Also connected exteriorly of unit 7, to the terminals D and E thereof, is an insulated clip 16 which is utilized by the splicer to establish contact with the tip side of each wire pair of cable 1 in identifying the pairs, as illustrated in FIGS. 1, 7 and 8. The jaws of clip 16 perferably have needle-like teeth 16′ which are capable of penetrating through the usual insulation on the conductors of cable 1 when the clip is applied thereto.

In the active use of cables, such as cable 1 referred to herein, in a conventional telephone system, the ring side of each wire pair normally is connected to one side of a central battery, with the other side of the battery being grounded, and the tip side is usually grounded through the central office equipment. When the wire pair is connected at its opposite end to a subscriber's telephone equipment which is in service, and the telephone hand piece is lifted from its cradle, current from the central office battery flows through the ring side of the wire pair, then through the telephone, then back through the tip side of the wire pair to ground, and finally back to the grounded side of the central battery.

When my improved testing apparatus is set up in the manner previously described for use in identifying the wire pairs of cable 1, the splicer at his remote station along the cable 1 applies the clip 16 to the tip side of any selected pair which is exposed and which will be assumed for this description is a so-called "dead" or inactive pair not in service. Under these circumstances, current from battery 5″ at the signal light unit 5 will flow through one of the numbered lights 5′, through diode 6, then through cable 4 to one plug of connector unit 3 and to the tip side of a corresponding wire pair of cable 1, through cable 1 to clip 16 at the splice. From the clip 16, the current will continue from one side of the clip to terminal D of relay unit 7, and from this terminal through normally closed contacts 11′ of relay 11 and then to terminal B of unit 7, to the tip side of the preselected talk pair of cable 1, through one of the plugs of connector unit 3 to one of the talk terminals provided thereon, and then over cable 4 to one of the talk terminals provided on indicator unit 5 which is connected to the opposite side of battery 5″ from which the current flow started, thereby completing the circuit. Having thus energized one of the numbered indicator lights 5′, the identification number can be immediately communicated by the helper at the central office station to the splicer at the remote splice station, as by verbal communication over the talk circuit which has been previously described and is illustrated generally in the drawings. Repetition of this procedure with each wire pair of cable 1 in the use of contact clip 16 will successively identify each wire pair according to the numerical identification of the respective signal lights 5′, regardless of their order of energization, until the pairs in the entire cable have been identified and tagged at the remote splice station. In the case of large cables, this may necessitate moving connector plug unit 3 on the terminal frame 2 from time to time as each group of one hundred pairs or other subdivided portion of the cable is completed.

Assuming now that a wire pair being checked for identification is in active use or busy, under these conditions, current will flow from the central office battery (not shown) over the tip side of the pair to clip 16 and then from the clip to terminal D of relay unit 7, and from this terminal to the normally closed contacts 10′ of relay 10, through the contacts to the solenoid of this relay, then through diode 17 to terminal C which is grounded, and finally back to the ground side of the central battery. This current flow would occur only momentarily, since energization of the aforementioned solenoid will instantaneously open contacts 10′ and close contacts 10″ of relay 10, causing energization of a warning signal light 15. This operation of relay 10 also instantaneously energizes the solenoid of relay 12, thereby closing its normally open contacts 12′ and causing current to flow from battery 14 through the solenoid of relay 10 to maintain the latter relay activated. At the same time, the current flow from battery 14 energizes the solenoid of relay 11 and opens the normally closed contacts 11′ of relay 11, thereby interrupting the circuit to the signal lights 5′ of the indicator unit 5 at the central office station. Thus, when the warning signal light 15 of relay unit 7 is energized, it signifies to the splicer that the wire pair to which the clip 16 has been applied is in use and the splicer should select another pair for identification. Accordingly, on removing the clip 16 from the tip side of the busy pair, the warning signal light 15 will deenergize and the relays will automatically restore themselves to their normal condition as shown in FIG. 6, and the apparatus is then ready for use in identifying another wire pair by application of the clip 16 to the tip side of the pair to be checked.

The use of two separate batteries 13 and 14 in the relay unit, with one battery being of higher voltage than the other, such as 24 volts and 48 volts, respectively, serves the important purpose of preventing relay 10 from chattering when testing a busy or active wire pair, as it would otherwise do without the provision of relays 11 and 12 and batteries 13 and 14. Accordingly, there is no interference with busy or active wire pairs during the checking and identification of the pairs in the cable. It is to be understood that my invention is not limited to use with telephone cables, but can be used equally effective with other cables of comparable cable system.

While the specific details of my invention have been herein shown and described, the invention is not confined thereto, as changes and alterations may be made without departing from the spirit thereof as defined in the appended claims.

I claim:

1. In apparatus for numerically identifying wire pairs in a multiconductor cable, wherein the pairs are connected at one end of the cable to the terminals of a main terminal frame, an electrically operable indicator unit having a plurality of numbered signal indicators operatively connected at the terminal frame to one conductor of each wire pair of a group, means at a remote point along the cable for successively contacting the corresponding conductors of each wire pair group and for causing energization of the respective signal indicators of the numbered indicator unit aforesaid, means for establishing communication between a station at the indicator unit and a station at said remote point for enabling successive communication to the remote station of the respective identification numbers signified by the indicator unit, and means responsive to the contacting of the respective wire pairs at the remote station along the cable during the identification operation for indicating pairs in active use.

2. In apparatus for numerically identifying wire pairs in a multiconductor cable, wherein the pairs are connected at one end of the cable to the terminals of a main terminal frame, an electrically operable indicator unit having a plurality of numbered signal indicators operatively connected at the terminal frame to one conductor of each wire pair of a group, means at a remote point along the cable for successively contacting the corresponding conductors of each wire pair group and for causing energization of the respective signal indicators of the numbered indicator unit aforesaid, means for establishing communication between a station at the indicator unit and a station at said remote point for enabling successive communication to the remote station of the respective identification numbers signified by the indicator unit, and visual signal means responsive to the contacting of the respective wire pairs at the remote station along the cable during the identification operation for indicating pairs in active use.

3. In apparatus for numerically identifying wire pairs in a multiconductor cable, wherein the pairs are connected at one end of the cable to the terminals of a main terminal frame, an electrically operable indicator unit having a plurality of numbered signal indicators operatively connected at the terminal frame to one conductor of each wire pair of a group, means at a remote point along the cable for successively contacting the corresponding conductors of each wire pair group and for causing energization of the respective signal indicators of the numbered indicator unit aforesaid, means for establishing communication between a station at the indicator unit and a station at said remote point for enabling successive communication to the remote station of the respective identification numbers signified by the indicator unit, and electrical relay means responsive to the contacting of the respective wire pairs at the remote station along the cable during the identification operation for indicating pairs in active use.

4. In apparatus for numerically identifying wire pairs in a multiconductor cable, wherein the pairs are connected at one end of the cable to the terminals of a main terminal frame, an electrically operable indicator unit having a plurality of numbered signal indicators operatively connected at the terminal frame to one conductor of each wire pair of a group, means at a remote point along the cable for successively contacting the corresponding conductors of each wire pair group and for causing energization of the respective signal indicators of the numbered indicator unit aforesaid, means for establishing communication between a station at the indicator unit and a station at said remote point for enabling successive communication to the remote station of the respective identification numbers signified by the indicator unit, and means responsive to the contacting of the respective wire pairs at the remote station along the cable during the identification operation for indicating pairs in active use, said last-named means including a plurality of selectively operable relay circuits for maintaining the indication of each pair in use until interruption of contact with the busy pair but without interference with such use during contact therewith.

5. Apparatus as defined in claim 1, wherein the signal indicator energizing means includes a source of potential responsive to a normally closed relay circuit, and wherein the means for indicating pairs in active use comprises separate relay means operable upon interruption of the first-mentioned relay circuit responsive to engagement of the contact means with a conductor of a wire pair while in active use, for producing a warning signal signifying a busy cable circuit.

References Cited

UNITED STATES PATENTS

| | | | |
|---|---|---|---|
| 1,738,710 | 12/1929 | Jones | 324—66 |
| 2,806,995 | 9/1957 | Meanley | 179—175 |
| 3,181,062 | 4/1965 | Scarlett | 324—66 |

KATHLEEN H. CLAFFY, *Primary Examiner.*

A. A. McGILL, *Assistant Examiner.*